(12) United States Patent
Shu et al.

(10) Patent No.: US 12,136,889 B2
(45) Date of Patent: Nov. 5, 2024

(54) POWER SYSTEM, DATA CENTER, AND CHARGING DEVICE

(71) Applicant: Huawei Digital Power Technologies Co., Ltd., Shenzhen (CN)

(72) Inventors: Zhou Shu, Dongguan (CN); Xiaofei Zhang, Shenzhen (CN); Peng Shuai, Shenzhen (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 89 days.

(21) Appl. No.: 18/184,091

(22) Filed: Mar. 15, 2023

(65) Prior Publication Data

US 2023/0216305 A1 Jul. 6, 2023

Related U.S. Application Data

(63) Continuation of application No. PCT/CN2020/115824, filed on Sep. 17, 2020.

(51) Int. Cl.
*H02M 7/23* (2006.01)
*B60L 53/12* (2019.01)
*H02J 1/00* (2006.01)
*H02J 1/10* (2006.01)
*H02J 7/00* (2006.01)
(Continued)

(52) U.S. Cl.
CPC ............... *H02M 7/23* (2013.01); *B60L 53/12* (2019.02); *H02J 1/001* (2020.01); *H02J 1/102* (2013.01); *H02J 7/00032* (2020.01); *H02J 7/02* (2013.01); *H02J 50/10* (2016.02); *H02M 3/01* (2021.05); *H02M 3/1584* (2013.01); *H02J 2207/20* (2020.01); *H02J 2310/48* (2020.01)

(58) Field of Classification Search
CPC ....... H02M 7/23; H02M 3/1584; B60L 53/12; H02J 1/001; H02J 7/02; H02J 2310/48
See application file for complete search history.

(56) References Cited

U.S. PATENT DOCUMENTS

2011/0304211 A1 12/2011 Peterson et al.
2012/0316691 A1 12/2012 Boardman et al.
(Continued)

FOREIGN PATENT DOCUMENTS

CN 201435001 Y 3/2010
CN 201781417 U 3/2011
(Continued)

*Primary Examiner* — Daniel Cavallari
(74) *Attorney, Agent, or Firm* — Maier & Maier, PLLC

(57) ABSTRACT

A power system, related to the field of electronic power. The power system includes a centralized controller and three power modules. Each phase of an alternating current power supply is connected to one power module, and an input end of each power module is connected to one phase of the alternating current power supply. Each power module includes a low voltage controller and at least two power units. Each power unit includes a unit controller. The centralized controller is connected to each low voltage controller by using a bus. The centralized controller sends a control signal to each unit controller by using each low voltage controller, to control the unit controller and/or a power conversion circuit. The power system can implement hot swap of the power module and improve on-site operation reliability.

20 Claims, 8 Drawing Sheets

(51) Int. Cl.
*H02J 7/02* (2016.01)
*H02J 50/10* (2016.01)
*H02M 3/00* (2006.01)
*H02M 3/158* (2006.01)

(56) References Cited

U.S. PATENT DOCUMENTS

| | | | |
|---|---|---|---|
| 2016/0247641 A1* | 8/2016 | Malapelle | H02M 7/003 |
| 2018/0262117 A1 | 9/2018 | Lu et al. | |
| 2018/0343009 A1* | 11/2018 | Li | H03K 17/223 |
| 2019/0283615 A1 | 9/2019 | Lee et al. | |
| 2023/0223860 A1* | 7/2023 | Everts | H02J 7/02 |
| | | | 363/125 |

FOREIGN PATENT DOCUMENTS

| | | |
|---|---|---|
| CN | 102891501 A | 1/2013 |
| CN | 203205969 U | 9/2013 |
| CN | 105743386 A | 7/2016 |
| CN | 103731022 B | 8/2016 |
| CN | 106487030 A | 3/2017 |
| CN | 110401252 A | 11/2019 |
| EP | 3242382 A1 | 11/2017 |
| EP | 3790155 A1 | 3/2021 |

* cited by examiner

POWER SYSTEM, DATA CENTER, AND CHARGING DEVICE

CROSS-REFERENCE TO RELATED APPLICATIONS

This application is a continuation of International Application No. PCT/CN2020/115824, filed on Sep. 17, 2020, the disclosure of which is hereby incorporated by reference in its entirety.

TECHNICAL FIELD

The embodiments relate to the field of power electronics technologies, a power system, a data center, and a charging device.

BACKGROUND

A power system can convert an unstable alternating current input into a stable direct current output or alternating current output and supply the output to a load device. Therefore, the power system is very important in an electric system. A medium-high voltage power system is widely applied to a scenario such as a data center and a charging pile for an electric vehicle.

The medium-high voltage power system may be a power system with an input or output voltage of 1 kV or higher. An input end of the medium-high voltage power system is connected to a three-phase alternating current power supply, and an input of each phase of the three-phase alternating current power supply is connected to one power module. Each power module includes a plurality of power units, and each power unit includes a unit controller and a power conversion circuit. An existing medium-high voltage power system may use a two-layer control architecture. A first layer is a centralized controller, configured to coordinate work of components in the system. A second layer is a unit controller, configured to control a working status of a power conversion circuit. The centralized controller communicates with each unit controller by using an optical fiber.

However, an optical fiber interface used to implement optical fiber communication cannot implement hot swap on a backplane. Therefore, the power module does not support the hot swap. In addition, installation and maintenance of the power unit require independent optical fiber installation steps. Consequently, on-site installation and maintenance reliability is reduced.

SUMMARY

The embodiments may provide a power system, a data center, and a charging device, to implement hot swap of a power module. This improves on-site installation and maintenance reliability.

According to a first aspect, the embodiments may provide a power system. The power system is externally connected to a three-phase alternating current power supply. The power system includes a centralized controller and three power modules, each phase of the alternating current power supply is connected to one power module, and an input end of each power module is connected to one phase of the alternating current power supply. Each power module includes a low voltage controller and at least two power units. Each power unit includes a unit controller and a power conversion circuit. The centralized controller is connected to each low voltage controller by using a bus. The centralized controller sends a control signal to each unit controller by using each low voltage controller, to control the unit controller and/or the power conversion circuit.

Because the centralized controller is connected to the low voltage controllers by using the bus, the power modules support hot swap. An optical fiber interface that needs to be reliably connected is deployed in the power module. The power module may be installed and tested in a factory. When installation and maintenance are conducted on site, an optical fiber installation step does not need to be independently conducted. This improves on-site operation reliability. In addition, with evolution of a power device, a quantity of power units may change. For example, the quantity of power units may decrease. When the quantity of power units changes, the power system may keep a system architecture unchanged, and may keep an external interface of the power module unchanged, so that difficulty in system reconstruction is reduced.

With reference to the first aspect, in a first possible implementation, a first hot swap interface is disposed on a backplane of the power system. A second hot swap interface corresponding to the first hot swap interface is disposed on the power module. The low voltage controller in the power module is connected to the centralized controller by using the bus, so that the power module supports hot swap. Therefore, the power module may implement hot swap by using the second hot swap interface and the first hot swap interface.

With reference to the first aspect, in a second possible implementation, the bus is an RS-485 bus or a controller area network (CAN) bus. Therefore, the power modules support the hot swap.

With reference to the first aspect, in a third possible implementation, in each power module, the low voltage controller communicates with each unit controller by using an optical fiber, so that a bandwidth between the low voltage controller and the unit controller may be increased, communication delay may be reduced, and isolation required by safety regulations may be provided.

With reference to the first aspect, in a fourth possible implementation, the centralized controller sends a first control signal to each unit controller of the $i^{th}$ phase by using a low voltage controller of the $i^{th}$ phase of the three-phase alternating current power supply, so that each unit controller of the $i^{th}$ phase controls output load balancing of a corresponding power conversion circuit, where i=1, 2, or 3.

With reference to the first aspect, in a fifth possible implementation, the low voltage controller of the $i^{th}$ phase of the three-phase alternating current power supply is further configured to: obtain a sampling signal of an output end of each power conversion circuit of the $i^{th}$ phase; determine, based on the sampling signal of the output end, a second control signal corresponding to each power conversion circuit of the $i^{th}$ phase; and send a corresponding second control signal to each unit controller of the $i^{th}$ phase. Each unit controller of the $i^{th}$ phase control is configured to control, based on the first control signal and the second control signal, a working status of a power conversion circuit in a power unit in which the unit controller is disposed.

The sampling signal of the output end may be a voltage signal or a current signal. The second control signal may be the sampling signal of the output end, or a signal obtained after the sampling signal of the output end is processed.

With reference to the first aspect, in a sixth possible implementation, the power system is configured to output a direct current. Each power conversion circuit includes an AC/DC circuit and a DC/DC circuit. An output end of the AC/DC circuit is connected to an input end of the DC/DC circuit. A first end that is formed after alternating current input ends of AC/DC circuits of the $i^{th}$ phase are connected in series is connected to an alternating current power supply of the $i^{th}$ phase. A second end that is formed after the alternating current input ends of the AC/DC circuits of the $i^{th}$ phase are connected in series is connected to a neutral point of the three-phase alternating current power supply. Output ends of all DC/DC circuits are connected in parallel to an output end of the power system. The AC/DC circuit is configured to: convert an alternating current into a direct current and transmit the direct current to the DC/DC circuit. The DC/DC circuit is configured to: perform direct current conversion on the obtained direct current and output the converted direct current.

With reference to the first aspect, in a seventh possible implementation, the power system is configured to output an alternating current. Each power conversion circuit includes an AC/DC circuit and a DC/AC circuit. An output end of the AC/DC circuit is connected to an input end of the DC/AC circuit. Output ends of all DC/AC circuits are connected in parallel to an output end of the power system. The AC/DC circuit is configured to: convert an alternating current into a direct current, and transmit the direct current to the DC/AC circuit. The DC/AC circuit is configured to convert the obtained direct current into an alternating current, and output the converted alternating current.

With reference to the first aspect, in an eighth possible implementation, the centralized controller is further configured to sample input voltages and input currents of all the power modules. The unit controller is further configured to sample an output voltage of an AC/DC circuit in a power unit in which the unit controller is disposed, so that the power system controls the AC/DC circuits by using a sampling result of an input voltage and an input current of the power system and a sampling result of an output direct current voltage, to perform power factor correction (PFC).

According to a second aspect, the embodiments may further provide a data center. The data center includes the power system provided in any one of the foregoing possible implementations, and further includes a load device. The power system is configured to supply power to the load device. The load device may be a network switch, a server cluster, a storage device, a monitoring device, a heat dissipation device, or the like.

According to a third aspect, the embodiments may further provide a charging device. The charging device includes the power system provided in any one of the foregoing possible implementations. The charging device is configured to charge an electric vehicle by using electric energy provided by the power system.

With reference to the third aspect, in a first possible implementation, the charging device is a charging pile. The power system is configured to supply power to the charging pile. The charging pile is configured to charge the electric vehicle.

With reference to the third aspect, in a second possible implementation, the charging device includes a wireless charging transmit terminal. The wireless charging transmit terminal is configured to provide the electric energy for a wireless charging receive terminal disposed on the electric vehicle. The wireless charging receive terminal is configured to charge a power battery pack on the electric vehicle.

DETAILED DESCRIPTION OF THE EMBODIMENTS

To make a person skilled in the art better understand the in embodiments, the following first describes an application scenario.

A power system may be a medium-high voltage power system. The medium-high voltage power system may refer to a power system with an input or output voltage of 1 kV or higher, for example, 6 kV, 10 kV, 35 kV, and 110 kV. The power system may be applied to a scenario such as a data center or a charging pile for an electric vehicle.

Figure 1:
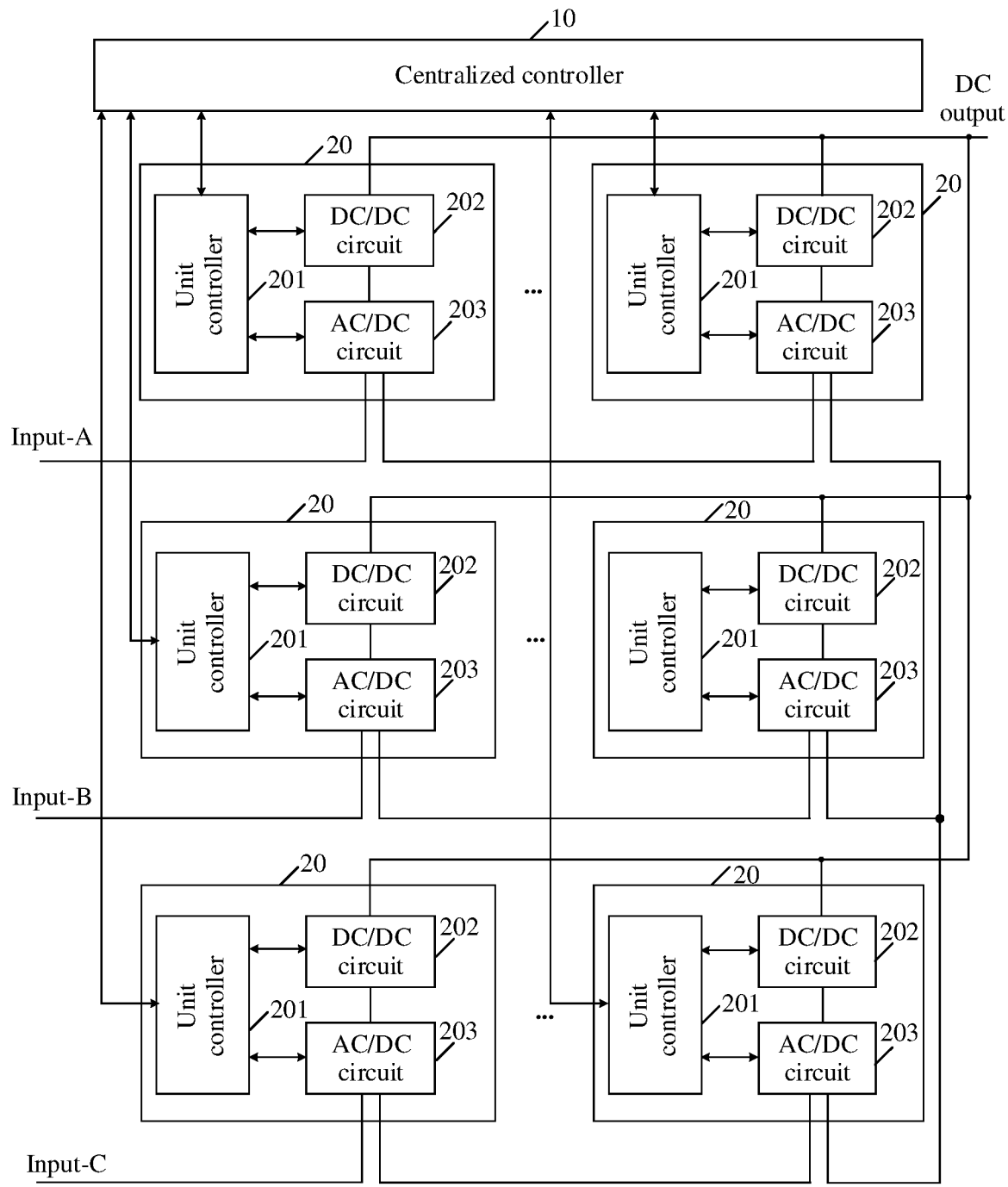
FIG. 1 is a schematic diagram of a medium-high voltage power system in the conventional technology.

FIG. 1 is a schematic diagram of a medium-high voltage power system in the conventional technology.

An input of the power system is a medium-high voltage, and an output is a low voltage direct current, for example, a direct current (DC) 240 V, a DC 336 V, and a DC 400 V.

Because there is a high voltage in the power system, a plurality of power units may be connected in series to reduce a division voltage of each power unit. Each of the three phases A, B, and C of an input end of the power system may be connected in series to a plurality of power units 20. Each power unit 20 may include a unit controller 201, a DC/DC circuit 202, and an AC/DC circuit 203. The DC/DC circuit 202 and the AC/DC circuit 203 may also be referred to as a power conversion circuit. A quantity of power units connected to an input of each phase may be the same.

The AC/DC circuit 203 may also be referred to as a rectifier, and configured to convert an input alternating current into a direct current. The DC/DC circuit 202 is configured to perform direct current conversion on a direct current to output a direct current that meets a power requirement. The DC/DC circuit 202 may be a boost circuit, a buck circuit, a buck-boost circuit, or another type of circuit that may implement the direct current conversion. This may be related to an output voltage of the power system. This is not limited in this embodiment. For example, when the output voltage is a low voltage, a high voltage input needs to be reduced. In this case, the DC/DC circuit is a buck circuit.

The power system adopts a modular design, and one power unit 20 is one module. In addition, the power system adopts a two-layer control architecture. A unit controller 201 in the power unit 20 controls working statuses of the DC/DC circuit 202 and the AC/DC circuit 203 in the unit controller. Then a centralized controller 10 controls unit controllers 201. The centralized controller 10 is a central control unit of the power system and configured to coordinate work of components in the system, to achieve optimal system performance.

The centralized controller 10 communicates with each unit controller 201 by using an optical fiber.

In some other implementations, the power system outputs an alternating current, for example, an alternating current (AC) 380/400/415 V. A similar difference of a principle of the alternating current lies in that the power conversion circuit is different. Details are not described herein again.

However, when the foregoing implementation is used, an optical fiber interface used to implement optical fiber communication cannot implement hot swap on a backplane, and when installation and maintenance of the power unit 20 are conducted, an optical fiber installation step needs to be independently conducted. Therefore, on-site operation reliability is reduced.

To resolve the foregoing problem, the embodiments may provide a power system, a data center, and a charging device. An input of each phase of a three-phase alternating current power supply of the power system is correspondingly connected to an input end of one power module. Each power module includes a low voltage controller and at least two power units. Each power unit includes a unit controller and a power conversion circuit. The centralized controller is connected to each low voltage controller by using a bus. Therefore, power modules may implement the hot swap. An optical fiber interface that needs to be reliably connected is deployed in the power module. The power module may be installed and tested in a factory. When installation and maintenance are conducted on site, the optical fiber installation step does not need to be independently conducted. This improves on-site operation reliability. In addition, with evolution of a power device, the quantity of power units may change. For example, the quantity of power units may decrease. When the quantity of power units changes, the power system may keep a system architecture unchanged, and may keep an external interface of the power module unchanged, so that difficulty in system reconstruction is reduced.

To make a person skilled in the art understand the embodiments more clearly, the following describes the embodiments with reference to the accompanying drawings.

The terms such as "first" and "second" are used only for the purpose of description and cannot be understood as indicating or implying relative importance or implicitly indicating a quantity of features indicated.

Unless otherwise specified and limited, a term "connection" should be understood in a broad sense. For example, a "connection" may be a fixed connection, a detachable connection, or an integrated structure, may be a direct connection, or may be an indirect connection through an intermediary.

Embodiment 1

An embodiment may provide a power system. The power system may be a medium-high voltage power system. An input of the power system is a three-phase alternating current power supply. The following provides descriptions with reference to the accompanying drawings.

Figure 2:
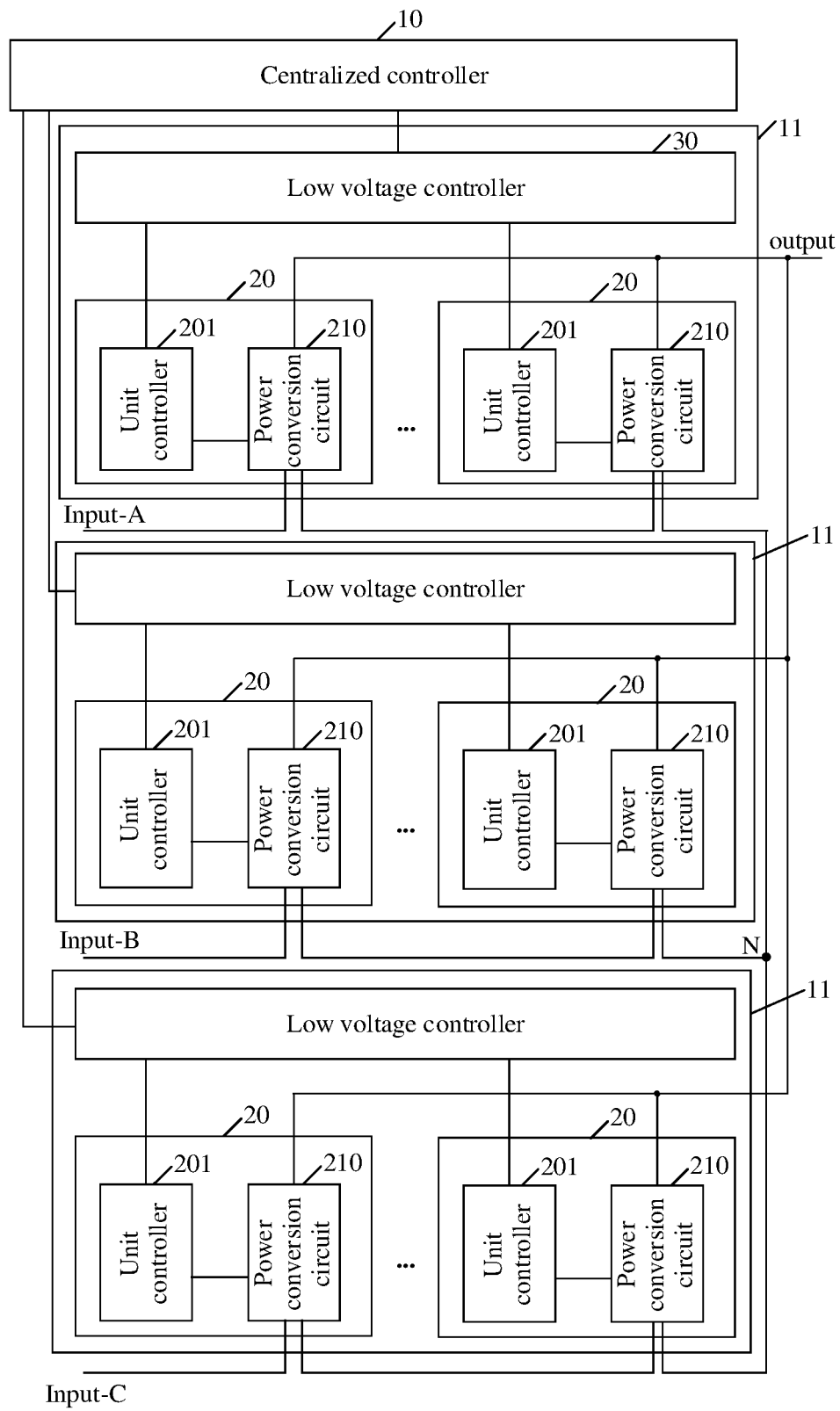
FIG. 2 is a schematic diagram of a power system according to an embodiment.

FIG. 2 is a schematic diagram of a power system according to an embodiment.

The power system includes a centralized controller 10 and a plurality of power modules 11.

An input end of the power system is connected to a three-phase alternating current power supply, and an input of each phase of the three-phase alternating current power supply is connected to one power module 11.

The input of each phase of the three-phase alternating current power supply in the figure is represented by Input-A, Input-B, and Input-C, and the input of each phase is correspondingly connected to an input end of the one power module 11.

Each power module 11 includes one low voltage controller 30 and at least two power units 20.

A quantity of power units 20 included in each power module 11 may be determined with reference to an input voltage and an output voltage of the power system, a parameter of a selected component, and other conditions. This is not limited in this embodiment.

Each power unit 20 includes a unit controller 201 and a power conversion circuit 210.

The power conversion circuit 210 is configured to perform power conversion on an input alternating current, and output the converted alternating current.

An input-A phase is used as an example. Alternating current input ends of power conversion circuits 210 in all power units 20 that are connected to the input-A phase are connected in series. A first end formed after the serial connection is connected to an input end of a power module in which the first end is disposed, that is, connected to an alternating current input of the input-A phase. A second end formed after the serial connection is converged at a same point N. The point N is a neutral point of the three-phase alternating current power supply. Output ends of the power conversion circuit are connected in parallel.

The centralized controller 10 is connected to low voltage controllers 30 by using a bus, for example, an RS-485 bus or a controller area network (CAN) bus. This is not limited in this embodiment.

The low voltage controller 30 is a bridge for communication between the centralized controller 10 and the unit controller 201 in the power module 11 in which the low voltage controller 30 is disposed, and used for communication between the unit controller 201 and the centralized controller 10.

The centralized controller 10 is a central control unit of the power system, and configured to coordinate work of components in the system, to achieve optimal system performance. The centralized controller 10 may send a control signal to unit controllers 201 by using the low voltage controllers 30.

The low voltage controller 30 communicates with each unit controller 201 in the power module by using an optical fiber, so that a bandwidth between the low voltage controller and the unit controller may be increased, communication delay may be reduced, and isolation required by safety regulations may be provided.

In conclusion, in the power system provided in this embodiment, because the centralized controller is connected to the low voltage controllers of the power modules by using the bus, the power modules support hot swap. An optical fiber interface that needs to be reliably connected is deployed in the power module. The power module may be installed and tested in a factory. When installation and maintenance are conducted on site, an optical fiber installation step does not need to be independently conducted. This improves on-site operation reliability. In addition, with evolution of a power device, a quantity of power units may change. For example, the quantity of power units may decrease. When the quantity of power units changes, the power system may keep a system architecture unchanged, and may keep an external interface of the power module unchanged, so that difficulty in system reconstruction is reduced.

Embodiment 2

The following describes a working principle of the power system.

Figure 3:
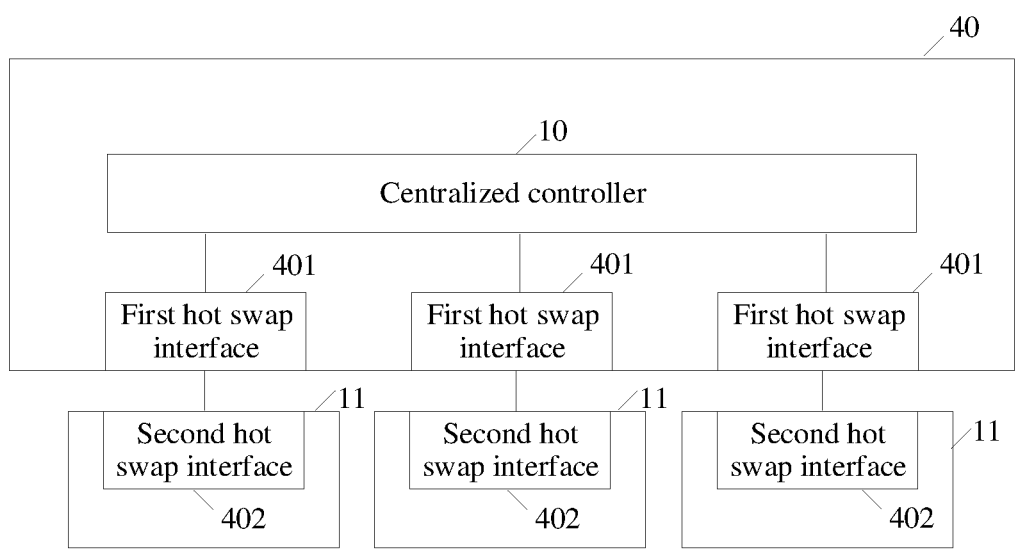
FIG. 3 is a schematic diagram of another power system according to an embodiment.

FIG. 3 is a schematic diagram of another power system according to an embodiment.

The centralized controller 10 of the power system is disposed on a backplane 40. A plurality of first hot swap interfaces 401 are further disposed on the backplane 40. Second hot swap interfaces 402 corresponding to the first hot swap interfaces 401 are disposed on the power module 11. The power module 11 implements hot swap by using the second hot swap interfaces 402 and the first hot swap interfaces 401.

The second hot swap interfaces 402 may be connected to a low voltage controller in a power module in which the second hot swap interfaces 402 are disposed. Therefore, when the first hot swap interfaces 401 are connected to the second hot swap interfaces 402, the centralized controller 10 sends a control signal to unit controllers by using low voltage controllers.

The centralized controller 10 sends a first control signal to each unit controller of the $i^{th}$ phase by using a low voltage controller of the $i^{th}$ phase, so that each unit controller of the $i^{th}$ phase controls output load balancing of a corresponding power conversion circuit, where i=1, 2, or 3.

In some embodiments, the low voltage controller of the $i^{th}$ phase is further configured to: obtain a sampling signal of an output end of each power conversion circuit of the $i^{th}$ phase; determine, based on the sampling signal of the output end, a second control signal corresponding to each power conversion circuit of the $i^{th}$ phase; and send a corresponding second control signal to each unit controller of the $i^{th}$ phase. The second control signal is a sampling signal of output ends of power conversion circuits in the power module, or a signal obtained after the sampling signal is processed.

The sampling signal may be a voltage signal or a current signal. This is not limited in this embodiment.

In some embodiments, the unit controller 201 may further control, based on a received second control signal that is sent by the low voltage controller 30, a working status of a power conversion circuit in a power unit in which the unit controller 201 is disposed.

In some other embodiments, the unit controller 201 controls, based on the first control signal and the second control signal, the working status of the power conversion circuit.

The power conversion circuit includes a controllable switching transistor. A type of the controllable switching transistor is not limited in this embodiment. For example, the controllable switching transistor may be an insulated gate bipolar transistor (IGBT), a metal oxide semiconductor field effect transistor (MOSFET), or a silicon carbide metal oxide semiconductor field effect transistor (SiC MOSFET).

The unit controller may send a pulse width modulation (PWM) signal to the controllable switching transistor, to control a working status of the controllable switching transistor.

In the embodiments, the centralized controller, the low voltage controller, the unit controller, and the like may be an application specific integrated circuit (ASIC), a programmable logic device (PLD), a digital signal processor (DSP), or a combination thereof. The PLD may be a complex programmable logic device (CPLD), a field-programmable gate array (FPGA), a generic array logic (GAL), or any combination thereof. This is not limited in this embodiment.

In conclusion, the power system provided in this embodiment may adopt a modular design, and an input of each phase of a three-phase alternating current power supply corresponds to an input end of one power module. Because the centralized controller is connected to each low voltage controller of each power module by using the bus, each power module supports the hot swap. An optical fiber interface that needs to be reliably connected is deployed in the power module. The power module may be installed and tested in a factory. When installation and maintenance are conducted on site, an optical fiber installation step does not need to be independently conducted. This improves on-site operation reliability. In addition, with evolution of a power device, a quantity of power units may change. For example, the quantity of power units may decrease. When the quantity of power units changes, the power system may keep a system architecture unchanged, and may keep an external interface of the power module unchanged, so that difficulty in system reconstruction is reduced.

Embodiment 2

The working principle of the power system is described below with reference to an implementation.

Figure 4:
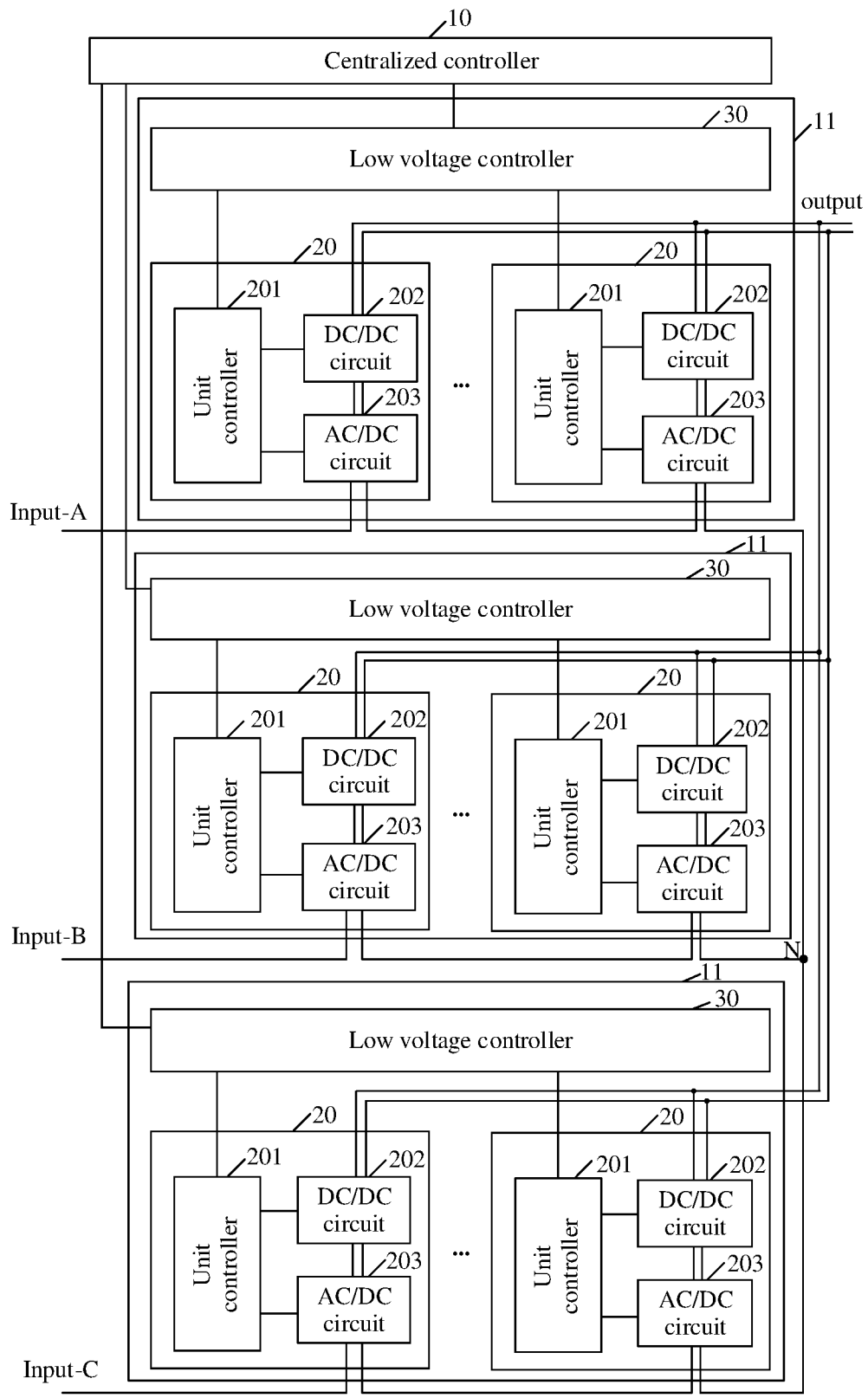
FIG. 4 is a schematic diagram of still another power system according to an embodiment.

FIG. 4 is a schematic diagram of still another power system according to an embodiment.

The power system provided in this embodiment may be configured to convert an input three-phase alternating current into a direct current and may output the direct current.

A power conversion circuit of each power unit 20 includes an AC/DC conversion circuit 203 and a DC/DC conversion circuit 202.

An input end (that is, an alternating current input end of the AC/DC circuit) of the AC/DC circuit 203 is an alternating current input end of a power conversion circuit in which the AC/DC circuit 203 is disposed. Input ends of a plurality of AC/DC circuits 203 in a same power module are connected in series. A first end formed after the serial connection is connected to an input of the $i^{th}$ phase of a three-phase alternating current power supply, and a second end formed after the serial connection is connected to a neutral point N of the three-phase alternating current power supply. In some embodiments, the AC/DC circuit 203 may also be referred to as a rectifier circuit or a rectifier.

An output end of the AC/DC circuit 203 is connected to an input end of the DC/DC circuit 202, and an output end of the DC/DC circuit 202 is connected to an output end of the power system. Output ends of the DC/DC circuits 202 are connected in parallel.

The AC/DC circuit 203 is configured to: convert an alternating current into a direct current, and transmit the direct current to the DC/DC circuit 202.

The DC/DC circuit 202 is configured to: perform direct current conversion on the obtained direct current, and output the converted direct current.

Figure 5:
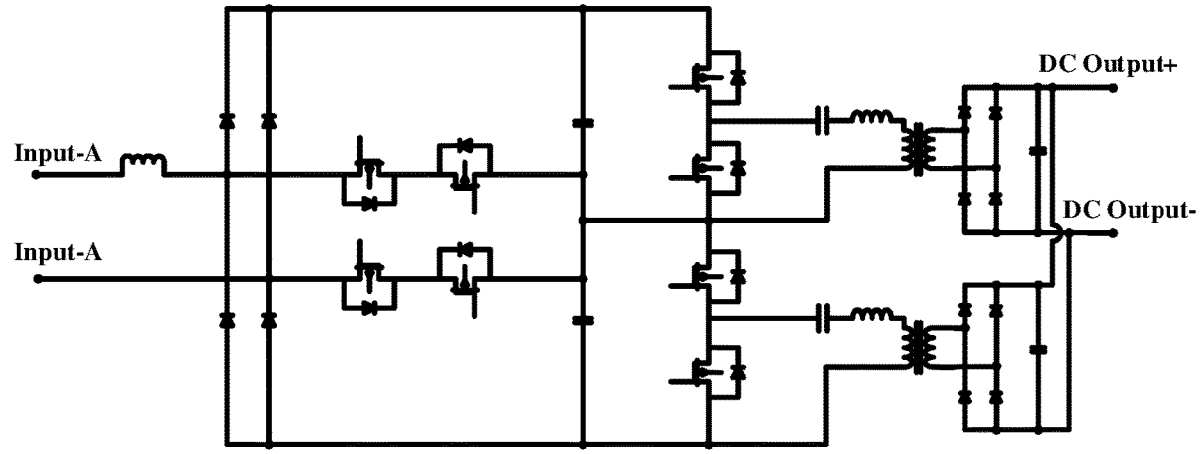
FIG. 5 is a schematic diagram of a power conversion circuit according to an embodiment.

FIG. 5 is a schematic diagram of a power conversion circuit according to an embodiment.

An input of a phase A is used as an example. The power conversion circuit converts an alternating current input by the phase A into a direct current and outputs the direct current. The DC/DC circuit 202 shown in the figure is an LLC resonant DC/DC converter. Structures and working principles of an AC/DC circuit and a DC/DC circuit are relatively mature in the existing technology, and details are not described in this embodiment again.

The low voltage controller 30 sends a corresponding second control signal to the unit controller 201 in a power module in which the low voltage controller 30 is disposed. The second control signal may be a sampling signal of direct current outputs of DC/DC circuits in the power module in which the low voltage controller 30 is disposed and may be a sampling voltage or a sampling current.

In some embodiments, the low voltage controller 30 may obtain a voltage sampling signal by using a voltage sensor, or obtain a current sampling signal by using a current sensor. Alternatively, the second control signal may be a signal obtained after the sampling signal is processed.

The low voltage controller 30 may be used for transferring of communication between the centralized controller 10 and the unit controller 201, and may send a signal from the centralized controller 10 to the unit controller 201.

The centralized controller 10 sends a first control signal to the unit controllers 201 by using the low voltage controller 30. The first control signal is used to balance output load of power conversion circuits.

The unit controller 201 may control, based on the first control signal and the second control signal, working statuses of switching transistors in the AC/DC conversion circuit 203 and the DC/DC conversion circuit 202.

In some embodiments, the centralized controller 10 is further configured to sample an input voltage and an input current of the power system, that is, sample input voltages and input currents of all power modules. The unit controller 201 is further configured to sample an output direct current voltage of the AC/DC circuit 203. The power system may control the working status of the AC/DC circuit based on the foregoing sampling result, to perform power factor correction (PFC).

In some embodiments, during an implementation, the unit controller 201 may include a controller of the DC/DC circuit and a controller of the AC/DC circuit. The controllers of the two parts may be integrated together or may be independent of each other. This is not limited in this embodiment. When the controllers of the two parts are independently disposed, the unit controller is a collective name of the controllers of the two parts.

Figure 6:
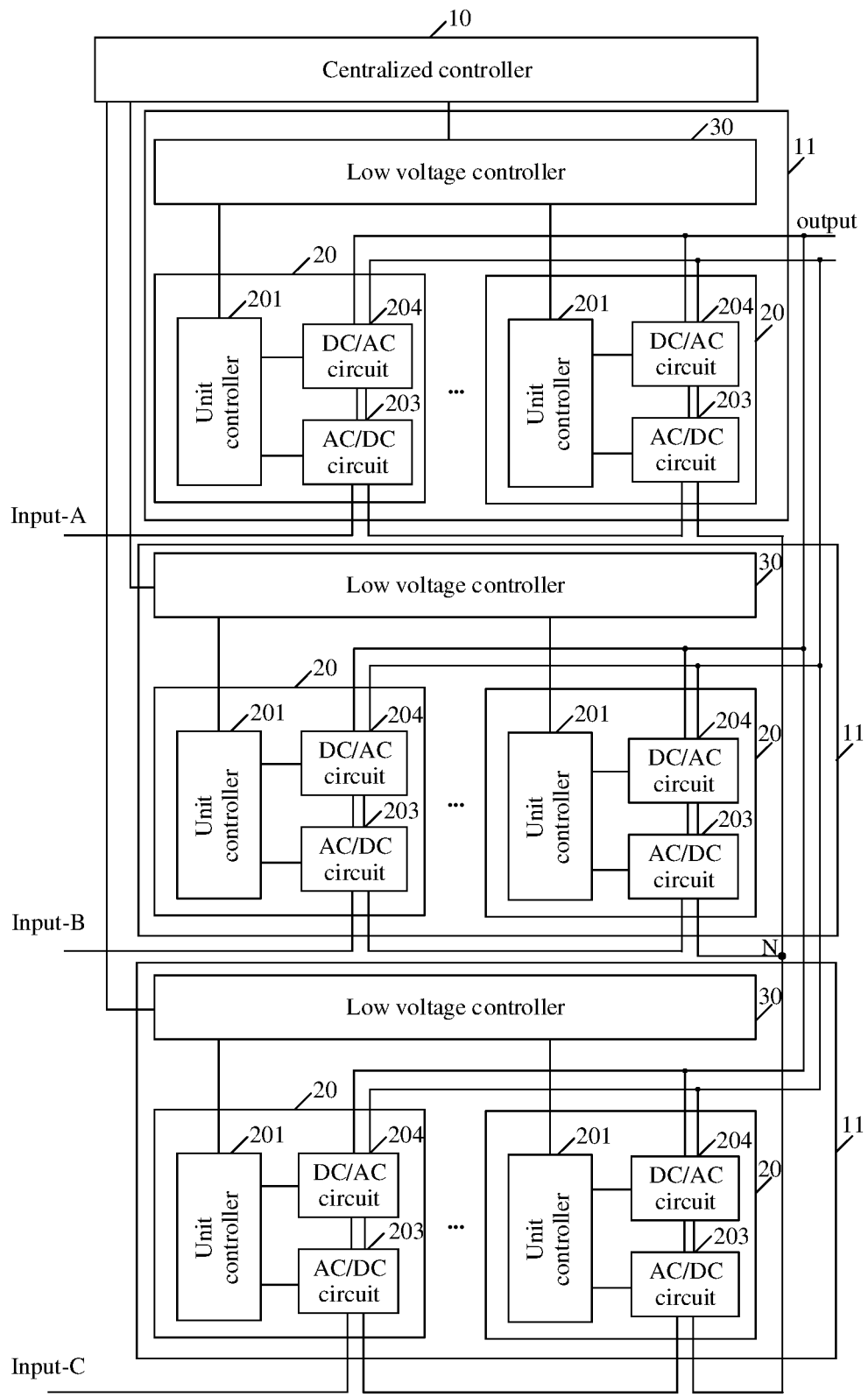
FIG. 6 is a schematic diagram of yet another power system according to an embodiment.

FIG. 6 is a schematic diagram of yet another power system according to an embodiment.

A power conversion circuit of a power unit includes an AC/DC conversion circuit 203 and a DC/AC conversion circuit 204.

An input end of the AC/DC circuit 203 is an alternating current input end of a power conversion circuit in which the AC/DC circuit 203 is disposed. That is, input ends of a plurality of AC/DC circuits 203 in a same power module are connected in series. A first end formed after the serial connection is connected to an input of one phase of a three-phase alternating current power supply, and a second end formed after the serial connection is connected to a neutral point N of the three-phase alternating current power supply. An output end of the AC/DC circuit 203 is connected to an input end of the DC/AC circuit 204, and an output end of the DC/AC circuit 204 is connected to an output end of the power system.

The AC/DC circuit 203 is configured to: convert an alternating current into a direct current, and transmit the direct current to the DC/AC circuit 204.

The DC/AC circuit 204 is configured to convert the obtained direct current into an alternating current and output the alternating current. In some embodiments, the DC/AC circuit 204 may also be referred to as an inverter circuit or an inverter.

For descriptions of the centralized controller 10, the low voltage controller 30, and the unit controller 201, refer to corresponding parts in FIG. 5. Details are not described in this embodiment again.

In some embodiments, during an implementation, the unit controller 201 may include a controller of the DC/AC circuit and a controller of the AC/DC circuit. The controllers of the two parts may be integrated together or may be independent of each other. This is not limited in this embodiment. When the controllers of the two parts are independently disposed, the unit controller is a collective name of the controllers of the two parts.

In conclusion, the power system provided in this embodiment adopts a modular design, and an input of each phase of the three-phase alternating current power supply corresponds to an input end of one power module. Because the centralized controller is connected to each low voltage controller of each power module by using a bus, each power module supports hot swap. An optical fiber interface that needs to be reliably connected is deployed in the power module. The power module may be installed and tested in a factory. When installation and maintenance are conducted on site, an optical fiber installation step does not need to be independently conducted. This improves on-site operation reliability. In addition, with evolution of a power device, a quantity of power units may change. For example, the quantity of power units may decrease. When the quantity of power units changes, the power system may keep a system architecture unchanged, and may keep an external interface of the power module unchanged, so that difficulty in system reconstruction is reduced. In addition, the centralized controller and the unit controller of the power system may further perform fault detection. This improves security of the power system.

Embodiment 3

Based on the power system provided in the foregoing embodiments, an embodiment may further provide a data center to which the power system is applied. The following provides descriptions with reference to the accompanying drawings.

Figure 7:
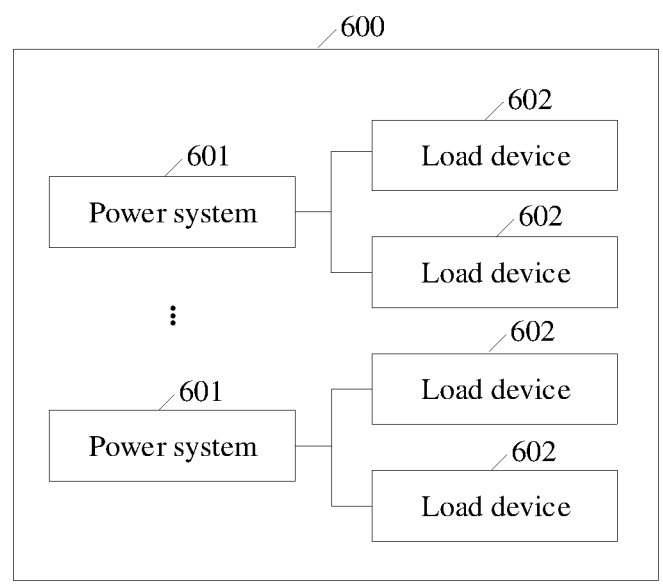
FIG. 7 is a schematic diagram of a data center according to an embodiment.

FIG. 7 is a schematic diagram of a data center according to an embodiment.

The data center is a global cooperative device network, and used to transfer, accelerate, display, calculate, and store data information on an Internet network infrastructure. A data center 600 provided in this embodiment may include a power system 601 and a load device 602.

The power system 601 is configured to supply power to the load device 602. A same power system may supply the power to one or more load devices. An output of the power system 601 may be a direct current or an alternating current. For descriptions of the power system, refer to the foregoing embodiments. Details are not described herein again in this embodiment.

Quantities of power systems and load devices included in the data center may not be limited in this embodiment.

The load device 602 may be a network switch, a server cluster, a storage device, a monitoring device, a heat dissipation device, or the like. This is not limited in this embodiment.

In conclusion, the data center provided in this embodiment may use the power system. An input end of the power system is connected to a three-phase alternating current power supply, and an input of each phase of the three-phase alternating current power supply is correspondingly connected to an input end of one power module. Each power module includes a low voltage controller and at least two power units. Each power unit includes a unit controller and a power conversion circuit. A centralized controller is connected to each low voltage controller by using a bus. The low voltage controller is used for transferring of communication between the unit controller and the centralized controller.

The power system adopts a modular design, and the input of each phase of the three-phase alternating current power supply corresponds to the input end of the one power module. Because the centralized controller is connected to the low voltage controllers of the power modules by using the bus, the power modules support hot swap. An optical fiber interface that needs to be reliably connected is deployed in the power module. The power module may be installed and tested in a factory. When installation and maintenance are conducted on site, an optical fiber installation step does not need to be independently conducted. This improves on-site operation reliability. In addition, with evolution of a power device, a quantity of power units may change. For example, the quantity of power units may decrease. When the quantity of power units changes, the power system may keep a system architecture unchanged, and may keep an external interface of the power module unchanged, so that difficulty in system reconstruction is reduced.

Therefore, the power system that has high reliability and is easy to be installed and maintained is provided for the data center, so that security and stability of the data center are improved.

An embodiment may further provide a charging device. The charging device includes the power system in the foregoing embodiments. The charging device is configured to charge an electric vehicle. The charging device may be a charging pile supporting wired charging or a charging device supporting wireless charging. Details are described below.

Figure 8:
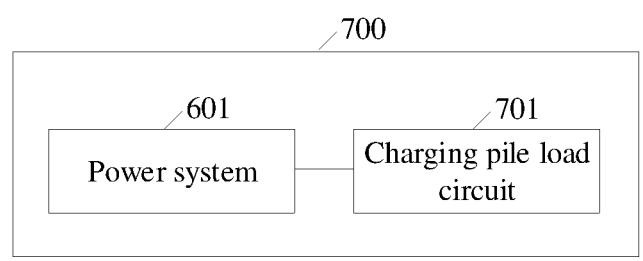
FIG. 8 is a schematic diagram of a charging pile according to an embodiment.

Embodiment 4: FIG. 8 is a schematic diagram of a charging pile according to an embodiment A charging pile 700 includes a power system 601 and a charging pile load circuit 701.

The power system 601 may be configured to supply power to the charging pile and may supply the power to the charging pile load circuit 701. In some embodiments, a load circuit of the charging pile 700 may include a storage circuit, a control circuit, a display circuit, a power circuit, and the like. This is not limited in this embodiment.

The charging pile 700 is configured to charge an electric vehicle. In some embodiments, the charging pile 700 is connected to a charging plug by using a cable, to charge the electric vehicle. In this case, the charging pile 700 may be disposed on the ground and may become a fixed charging station or a charging parking space.

Figure 9:
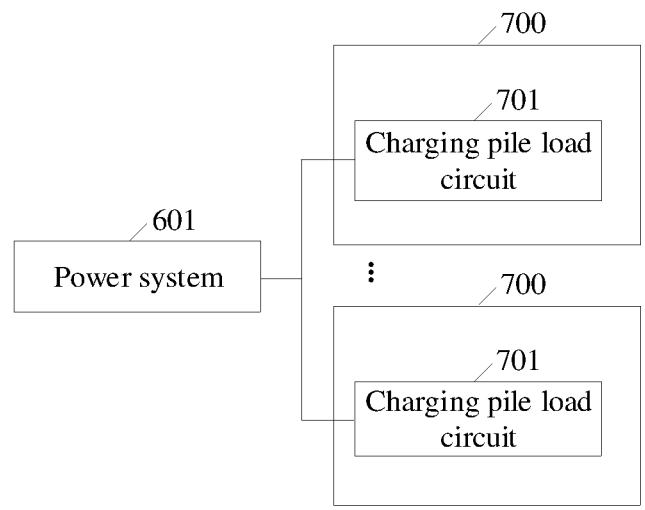
FIG. 9 is a schematic diagram of an application scenario of a power system according to an embodiment.

FIG. 9 is a schematic diagram of an application scenario of a power system according to an embodiment.

In some embodiments, a same power system 601 may further supply power to a plurality of charging piles 700.

In this case, an output end of the power system 601 is connected to the plurality of charging piles 700, to supply the power to charging pile load circuits of the plurality of charging piles 700.

In conclusion, the charging pile provided in this embodiment may be charged by using the power system. An input end of the power system is connected to a three-phase alternating current power supply, and an input of each phase of the three-phase alternating current power supply is correspondingly connected to an input end of one power module. Each power module includes a low voltage controller and at least two power units. Each power unit includes a unit controller and a power conversion circuit. A centralized controller is connected to each low voltage controller by using a bus. The low voltage controller is used for transferring of communication between the unit controller and the centralized controller.

The power system adopts a modular design, and the input of each phase of the three-phase alternating current power supply corresponds to the input end of the one power module. Because the centralized controller is connected to each low voltage controller of each power module by using the bus, each power module supports hot swap. An optical fiber interface that needs to be reliably connected is deployed in the power module. The power module may be installed and tested in a factory. When installation and maintenance are conducted on site, an optical fiber installation step does not need to be independently conducted. This improves on-site operation reliability. In addition, with evolution of a power device, a quantity of power units may change. For example, the quantity of power units may decrease. When the quantity of power units changes, the power system may keep a system architecture unchanged, and may keep an external interface of the power module unchanged, so that difficulty in system reconstruction is reduced. Therefore, the power system that has high reliability and is easy to be installed and maintained is provided for the charging pile, so that security and stability of the charging pile are improved.

Embodiment 5

The charging device includes a wireless charging transmit terminal. The wireless charging transmit terminal is configured to provide electric energy for a wireless charging receive terminal disposed on an electric vehicle. The wireless charging receive terminal is configured to charge a power battery pack on the electric vehicle. The following provides descriptions with reference to the accompanying drawings.

Figure 10:
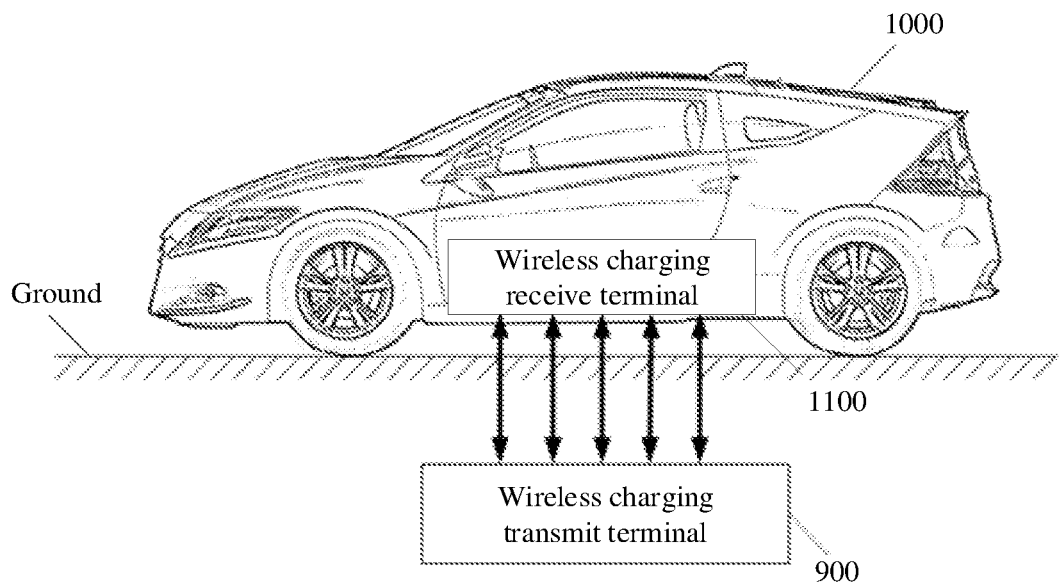
FIG. 10 is a schematic diagram of a wireless charging transmit terminal according to an embodiment.

FIG. 10 is a schematic diagram of a wireless charging transmit terminal according to an embodiment.

A wireless charging transmit terminal 900 includes the power system provided in the foregoing embodiments. The power system is configured to supply power to the transmit terminal, and may be configured to supply the power to a control module, a wireless communications module, and a power module of the transmit terminal.

In a wireless charging scenario, the wireless charging transmit terminal 900 may be configured to send electric energy in a form of an alternating magnetic field. An electric vehicle 1000 includes a wireless charging receive terminal 1100, and is configured to convert the alternating magnetic field into electric energy to charge a power battery pack. This implements non-contact charging. The wireless charging transmit terminal 900 may be disposed on the ground or buried underground, to form a wireless charging station, a wireless charging parking space, a wireless charging road, or the like.

In conclusion, the wireless charging transmit terminal provided in this embodiment may be charged by using the power system. An input end of the power system is connected to a three-phase alternating current power supply, and an input of each phase of the three-phase alternating current power supply is correspondingly connected to an input end of one power module. Each power module includes a low voltage controller and at least two power units. Each power unit includes a unit controller and a power conversion circuit. A centralized controller is connected to each low voltage controller by using a bus. The low voltage controller is used for transferring of communication between the unit controller and the centralized controller.

The power system adopts a modular design, and the input of each phase of the three-phase alternating current power supply corresponds to the input end of the one power module. Because the centralized controller is connected to each low voltage controller of each power module by using the bus, each power module supports hot swap. An optical fiber interface that needs to be reliably connected is deployed in the power module. The power module may be installed and tested in a factory. When installation and maintenance are conducted on site, an optical fiber installation step does not need to be independently conducted. This improves on-site operation reliability. In addition, with evolution of a power device, a quantity of power units may change. For example, the quantity of power units may decrease. When the quantity of power units changes, the power system may keep a system architecture unchanged, and may keep an external interface of the power module unchanged, so that difficulty in system reconstruction is reduced. Therefore, security and stability of the wireless charging transmit terminal are improved.

It should be understood that "at least one (item)" refers to one or more and "a plurality of" refers to two or more. The term "and/or" is used for describing an association relationship between associated objects and represents that three relationships may exist. For example, "A and/or B" may represent the following three cases: only A exists, only B exists, and both A and B exist, where A and B may be singular or plural. The character "/" may indicate an "or" relationship between the associated objects. "At least one of the following items (pieces)" or a similar expression thereof refers to any combination of these items, including any combination of singular items (pieces) or plural items (pieces). For example, at least one of a, b, or c may indicate a, b, c, a and b, a and c, b and c, or a, b, and c, where a, b, and c may be singular or plural.

In this embodiment, a connection manner between circuit modules is only an example and is used to simply indicate a connection relationship between the modules. A quantity of connection lines is not limited to a quantity of connection lines in an actual hardware circuit.

The foregoing embodiments are only used to describe the embodiments and are not limiting. Although described in detail with reference to the foregoing embodiments, an ordinary person skilled in the art should understand that they may still make modifications to the embodiments or make equivalent replacements without departing from the scope of the embodiments.

What is claimed is:

1. A power system, configured to externally connect to a three-phase alternating current power supply, the power system comprising:
    a centralized controller; and
    three power modules, each phase of the alternating current power supply is connected to one power module, and an input end of each power module is connected to one phase of the alternating current power supply;
    each power module comprises a low voltage controller and at least two power units, and each power unit comprises a unit controller and a power conversion circuit;
    the centralized controller is connected to each low voltage controller by using a bus; and
    the centralized controller is configured to sends a control signal to each unit controller by using each low voltage controller, to control the unit controller and/or the power conversion circuit.

2. The power system according to claim 1, wherein a first hot swap interface is disposed on a backplane of the power system;
    a second hot swap interface corresponding to the first hot swap interface is disposed on the power module; and
    the power module is configured to implements hot swapping by using the second hot swap interface and the first hot swap interface.

3. The power system according to claim 1, wherein the bus is an RS-485 bus or a controller area network (CAN) bus.

4. The power system according to claim 1, wherein, in one power module, the low voltage controller is configured to communicates with each unit controller by using an optical fiber.

5. The power system according to claim 1, wherein the centralized controller is configured to sends a first control signal to each unit controller of the $i^{th}$ phase by using a low voltage controller of the $i^{th}$ phase, so that each unit controller of the $i^{th}$ phase controls output load balancing of a corresponding power conversion circuit, wherein i=1, 2, or 3.

6. The power system according to claim 5, wherein the low voltage controller of the $i^{th}$ phase is further configured to:
    obtain a sampling signal of an output end of each power conversion circuit of the $i^{th}$ phase;
    determine, based on the sampling signal of the output end, a second control signal corresponding to each power conversion circuit of the $i^{th}$ phase; and
    send a corresponding second control signal to each unit controller of the $i^{th}$ phase; and
    each unit controller of the $i^{th}$ phase is configured to control, based on the first control signal and the second control signal, a working status of a power conversion circuit in a power unit in which the unit controller is disposed.

7. The power system according to claim 5, wherein the power system is configured to output a direct current;
    each power conversion circuit comprises an AC/DC circuit and a DC/DC circuit, and an output end of the AC/DC circuit is connected to an input end of the DC/DC circuit;
    a first end that is formed after alternating current input ends of AC/DC circuits of the $i^{th}$ phase are connected in series is connected to an alternating current power supply of the $i^{th}$ phase, and
    a second end that is formed after the alternating current input ends of the AC/DC circuits of the $i^{th}$ phase are connected in series is connected to a neutral point of the three-phase alternating current power supply;
    output ends of all DC/DC circuits are connected in parallel;
    the AC/DC circuit is configured to: convert an alternating current into a direct current, and transmit the direct current to the DC/DC circuit; and
    the DC/DC circuit is configured to: perform direct current conversion on the obtained direct current, and output the converted direct current.

8. The power system according to claim 5, wherein the power system is configured to output an alternating current;

each power conversion circuit comprises an AC/DC circuit and a DC/AC circuit, and an output end of the AC/DC circuit is connected to an input end of the DC/AC circuit;

a first end that is formed after alternating current input ends of AC/DC circuits of the $i^{th}$ phase are connected in series is connected to an alternating current power supply of the $i^{th}$ phase, and a second end that is formed after the alternating current input ends of the AC/DC circuits of the $i^{th}$ phase are connected in series is connected to a neutral point of the three-phase alternating current power supply;

output ends of all DC/AC circuits are connected in parallel;

the AC/DC circuit is configured to: convert an alternating current into a direct current, and transmit the direct current to the DC/AC circuit; and the DC/AC circuit is configured to convert the obtained direct current into an alternating current, and output the converted alternating current.

9. The power system according to claim 7, wherein the centralized controller is further configured to sample input voltages and input currents of all the power modules, and the unit controller is further configured to sample an output voltage of an AC/DC circuit in a power unit in which the unit controller is disposed, so that the power system controls the AC/DC circuits by using a sampling result of an input voltage and an input current of the power system and a sampling result of an output direct current voltage.

10. The power system according to claim 8, wherein the centralized controller is further configured to sample input voltages and input currents of all the power modules, and the unit controller is further configured to sample an output voltage of an AC/DC circuit in a power unit in which the unit controller is disposed, so that the power system controls the AC/DC circuits by using a sampling result of an input voltage and an input current of the power system and a sampling result of an output direct current voltage.

11. The power system according to claim 7, wherein the DC/DC circuit is an LLC resonant DC/DC converter.

12. The power system according to claim 6, wherein the power system is configured to output a direct current;

each power conversion circuit comprises an AC/DC circuit and a DC/DC circuit, and an output end of the AC/DC circuit is connected to an input end of the DC/DC circuit;

a first end that is formed after alternating current input ends of AC/DC circuits of the $i^{th}$ phase are connected in series is connected to an alternating current power supply of the $i^{th}$ phase, and a second end that is formed after the alternating current input ends of the AC/DC circuits of the $i^{th}$ phase are connected in series is connected to a neutral point of the three-phase alternating current power supply;

output ends of all DC/DC circuits are connected in parallel;

the AC/DC circuit is configured to: convert an alternating current into a direct current, and transmit the direct current to the DC/DC circuit; and the DC/DC circuit is configured to: perform direct current conversion on the obtained direct current; and output the converted direct current.

13. The power system according to claim 6, wherein the power system is configured to output an alternating current;

each power conversion circuit comprises an AC/DC circuit and a DC/AC circuit, and an output end of the AC/DC circuit is connected to an input end of the DC/AC circuit;

a first end that is formed after alternating current input ends of AC/DC circuits of the $i^{th}$ phase are connected in series is connected to an alternating current power supply of the $i^{th}$ phase, and a second end that is formed after the alternating current input ends of the AC/DC circuits of the $i^{th}$ phase are connected in series is connected to a neutral point of the three-phase alternating current power supply;

output ends of all DC/AC circuits are connected in parallel;

the AC/DC circuit is configured to: convert an alternating current into a direct current, and transmit the direct current to the DC/AC circuit; and the DC/AC circuit is configured to convert the obtained direct current into an alternating current; and output the converted alternating current.

14. A data center, comprising a power system and a load device, wherein the power system is configured to supply power to the load device; and the power system, configured to externally connect to a three-phase alternating current power supply, wherein the power system comprises a centralized controller and three power modules, each phase of the alternating current power supply is connected to one power module, and an input end of each power module is connected to one phase of the alternating current power supply;

each power module comprises a low voltage controller and at least two power units, and each power unit comprises a unit controller and a power conversion circuit;

the centralized controller is connected to each low voltage controller by using a bus; and the centralized controller is configured to sends a control signal to each unit controller by using each low voltage controller, to control the unit controller and/or the power conversion circuit.

15. The data center according to claim 14, wherein the centralized controller is configured to sends a first control signal to each unit controller of the $i^{th}$ phase by using a low voltage controller of the $i^{th}$ phase, so that each unit controller of the $i^{th}$ phase controls output load balancing of a corresponding power conversion circuit, wherein i=1, 2, or 3.

16. The data center according to claim 14, wherein the low voltage controller of the $i^{th}$ phase is further configured to:

obtain a sampling signal of an output end of each power conversion circuit of the $i^{th}$ phase;

determine, based on the sampling signal of the output end, a second control signal corresponding to each power conversion circuit of the $i^{th}$ phase; and send a corresponding second control signal to each unit controller of the $i^{th}$ phase; and each unit controller of the $i^{th}$ phase is configured to control, based on the first control signal and the second control signal, a working status of a power conversion circuit in a power unit in which the unit controller is disposed.

17. The data center according to claim 14, wherein the power system is configured to output a direct current;

each power conversion circuit comprises an AC/DC circuit and a DC/DC circuit, and an output end of the AC/DC circuit is connected to an input end of the DC/DC circuit;

a first end that is formed after alternating current input ends of AC/DC circuits of the $i^{th}$ phase are connected in series is connected to an alternating current power supply of the $i^{th}$ phase, and a second end that is formed after the alternating current input ends of the AC/DC circuits of the $i^{th}$ phase are connected in series is connected to a neutral point of the three-phase alternating current power supply;

output ends of all DC/DC circuits are connected in parallel;

the AC/DC circuit is configured to: convert an alternating current into a direct current, and transmit the direct current to the DC/DC circuit; and the DC/DC circuit is configured to: perform direct current conversion on the obtained direct current, and output the converted direct current.

18. A charging device, comprising a power system, wherein the charging device is configured to charges an electric vehicle by using electric energy provided by the power system;

the power system, configured to externally connect to a three-phase alternating current power supply, wherein the power system comprises a centralized controller and three power modules, each phase of the alternating current power supply is connected to one power module, and an input end of each power module is connected to one phase of the alternating current power supply;

each power module comprises a low voltage controller and at least two power units, and each power unit comprises a unit controller and a power conversion circuit;

the centralized controller is connected to each low voltage controller by using a bus; and the centralized controller is configured to sends a control signal to each unit controller by using each low voltage controller, to control the unit controller and/or the power conversion circuit.

19. The charging device according to claim 18, wherein the charging device is a charging pile.

20. The charging device according to claim 18, further comprising:

a wireless charging transmit terminal configured to provide the electric energy for a wireless charging receive terminal disposed on the electric vehicle; and the wireless charging receive terminal is configured to charge a power battery pack on the electric vehicle.

* * * * *